INVENTOR.
D. C. BICHEL

Nov. 3, 1970  D. C. BICHEL  3,537,243
COMBINE PLATFORM SUPPORTING STRUCTURE
Filed Nov. 13, 1968  2 Sheets-Sheet 2

INVENTOR.
D. C. BICHEL

# United States Patent Office 3,537,243
Patented Nov. 3, 1970

3,537,243
COMBINE PLATFORM SUPPORTING STRUCTURE
Darwin Carl Bichel, East Moline, Ill., assignor to Deere & Company, Moline, Ill., a corporation of Delaware
Filed Nov. 13, 1968, Ser. No. 775,341
Int. Cl. A01d *41/04*
U.S. Cl. 56—21
10 Claims

ABSTRACT OF THE DISCLOSURE

A pull-type combine having a mobile body with a forwardly extending vertically adjustable feeder house and a transversely elongated harvesting platform carried by the forward end of the feeder house. The feeder house includes a rigid frame pivotally attached to and extending forwardly from the combine body and a hollow housing which supports the platform at its forward end, the housing being adjustably connected to the frame to permit adjustment of the front end of the housing and consequently the tilt of the platform about a fore-and-aft axis.

BACKGROUND OF THE INVENTION

This invention relates to a structure for supporting a transversely elongated forwardly disposed harvesting platform on an agricultural harvesting machine such as a combine or the like.

A combine typically includes a mobile main separator body with a forward crop inlet and a forwardly disposed harvesting header, which removes the crop from the field as the machine advances, and delivers it rearwardly through the inlet to the separating mechanism within the combine body. The header conventionally includes a transversely elongated harvesting platform, which removes the crop from the field and converges it for delivery through a fore-and-aft feeder house or elevator housing to the combine crop inlet. The harvesting platform is conventionally mounted on and supported by the forward end of the feeder house, which is also conventionally vertically adjustable to vary the operating height of the platform.

With the increasing size and capacity of the combines, there has been a corresponding increase in the width of the harvesting platforms, so that harvesting platforms with widths in excess of 20 feet are now commonplace on self-propelled combines. Such relatively wide platforms are, of course, quite heavy and, since they are supported by the feeder house, the feeder house must have a relatively strong construction.

On self-propelled combines, the feeder house is conventionally centered on the platform so that the opposite ends of the platform are spaced equal distances from the opposite sides of the feeder house. However, the drive mechanisms for the various harvesting components on the platform are conventionally located on the left side of the platform, causing the left side of the platform to be substantially heavier than the right side, so that a twisting moment is exerted on the forward end of the feeder house. While this tendency for the left side of the platform to sag can be compensated for when the machine is assembled, when the machine is in use and the header components are subjected to additional stresses, the left side of the platform can begin to sag. Also, it had previously been conventional to provide a feeder house that was permanently attached to the platform, whereas it is present practice to provide platforms that are quickly demountable from the front end of the feeder house to provide quick replacement of the type or size of platform. Of course, the different types and sizes of platforms will have different weight distributions, and the built-in distortion of the feeder house to compensate for the imbalance of one platform, could be unsatisfactory for a different platform.

In pull-type PTO-powered combines, the problem is more acute, since the location of the fore-and-aft draft member limits the extension of the platform on the left side of the feeder house to a relatively short distance, and the right end of the platform is spaced a substantially greater distance from the feeder house than the left end. Obviously, the wider the platform, the greater the degree of imbalance. The relatively large, inherent imbalance in such platforms for pull-type machines, of course, exerts a greater twisting moment on the feeder house, putting a greater stress on the feeder house components. Again, the imbalance can be originally compensated for, but as the machine is used, the right end of the platform tends to sag. Also, the platform is often detachable from the feeder huose, and the different size platforms affects the weight distribution to vary the couple on the front end of the feeder house to a substantial degree.

SUMMARY OF THE INVENTION

According to the present invention, a novel feeder house construction is provided wherein the feeder house is of strong and durable construction and is adapted to accommodate the stresses caused by the uneven weight distribution of the platform. More specifically, the feeder house utilizes a separate torque frame to support the platform rather than the sheet metal exterior housing portion of the feeder house.

An important feature of the invention resides in the provision of means for adjusting the platform relative to the feeder house frame, so that the tilt of the platform about a fore-and-aft axis can be varied to compensate for sagging of one end of the platform due to stress and wear on the components or to accommodate changes in the size or type of platform, thereby permitting the platform to be maintained in a substantially level condition regardless of the configuration or size of platform.

Still another feature of the invention resides in the fact that the torque frame within the feeder house permits the use of lighter weight housing exterior while providing a stronger and more durable construction.

DESCRIPTION OF THE PREFERRED EMBODIMENT

Figure 1:
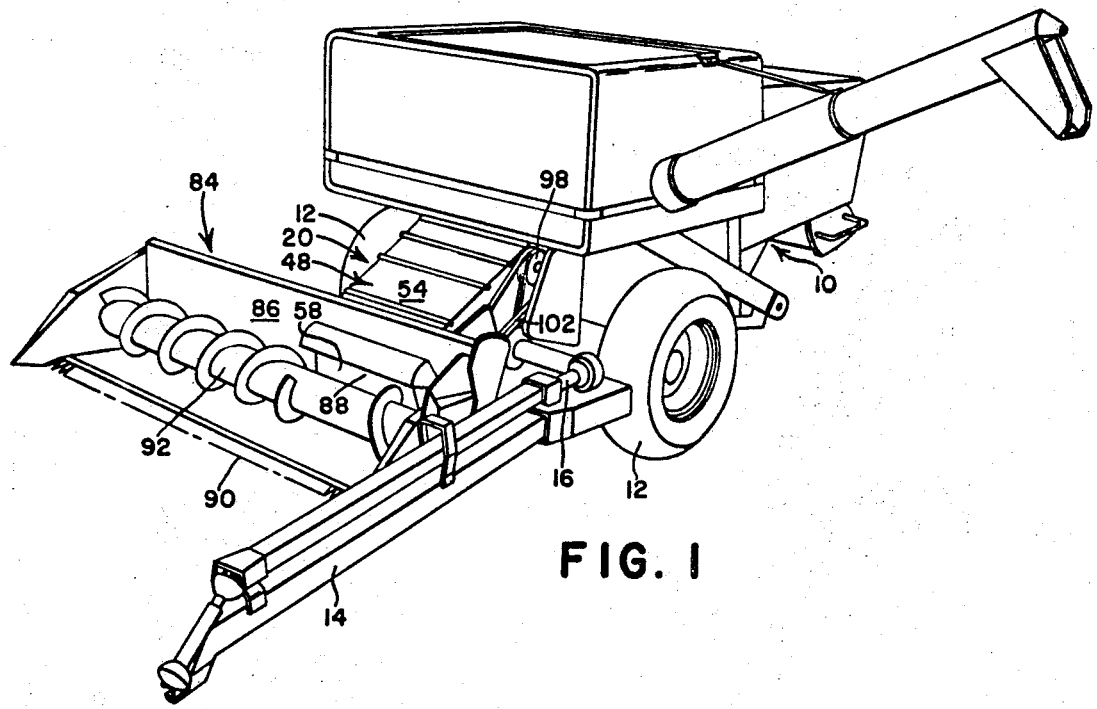
FIG. 1 is an upper left front perspective of a pull-type combine in which the invention is embodied.
Figure 2:
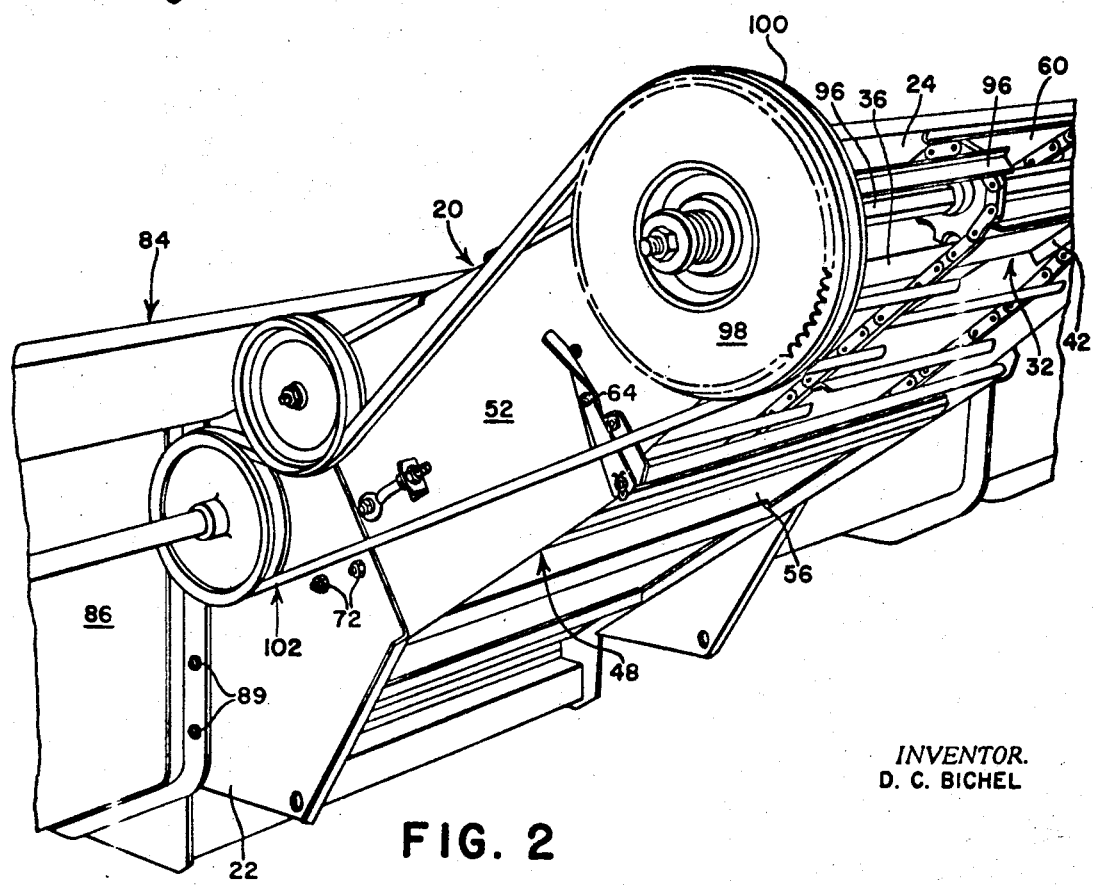
FIG. 2 is a left rear perspective of a portion of the feeder house and platform removed from the combine.
Figures 3, 4, 5:
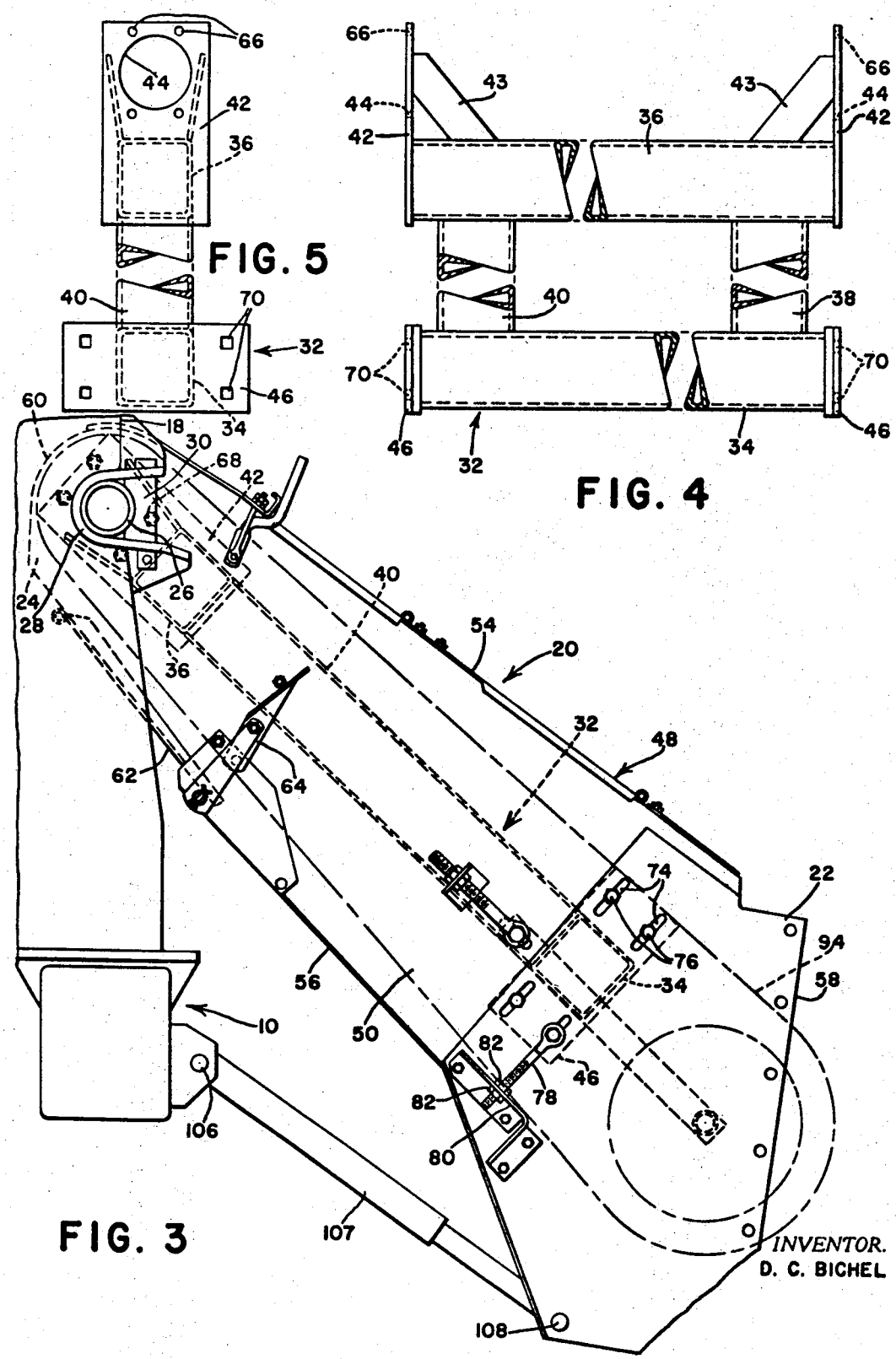
FIG. 3 is a right side elevation view of the feeder house and the forward portion of the combine.
FIG. 4 is a plan view of the feeder house frame, with intermediate portions of the frame members removed.
FIG. 5 is a side elevation view of the feeder house frame shown in FIG. 4.

The invention is embodied in a pull-type PTO-powdered combine having a main separator body 10 mounted on the pair of transversely spaced supported wheels 12 and connectible to a towing vehicle through a fore-and-aft extending draft member 14. A fore-and-aft drive shaft 16 is mounted over the draft member and has its forward end connectible to the PTO of the towing vehicle, the rearward end of the shaft being drivingly connected to the various drives for the combine components.

The body 10 has a forward crop inlet opening 18 and a generally fore-and-aft extending feeder house or crop infeed elevator housing 20 extends forwardly from the body 10 at the inlet opening 18. The feeder house 20 has front and rear ends 22 and 24 respectively and is vertically adjustable about its rearward end on a pair of pivot pins 26, which project outwardly from the opposite sides of the feeder house and are received in a pair of C-shaped brackets 28 attached to the combine body, the pivot pins being locked in the brackets by removable pins 30. While only the right side pivot pin 26 and bracket 28 are shown in the drawings, those familiar with the art will recognize that the pins and brackets are disposed on both sides of the feeder house, since the above represents more or less conventional means for mounting the feeder house to the combine body. While the feeder house is swingable in a vertical arc about the pivot pins 26, the front end 22 of the feeder house is normally disposed relatively close to the ground during operation of the combine, so that the feeder house is normally inclined downwardly and forwardly from the body.

The feeder house includes a rigid generally rectangular frame, indicated in its entirety by the numeral 32. The frame includes front and rear transverse frame members 34 and 36, respectively, which extend the width of the feeder house and are constructed of hollow relatively strong tubing, having a substantially square cross section. The opposite ends of the front and rear transverse members are respectively connected by a pair of fore-and-aft frame members 38 and 40, which are respectively constructed of the same material as the front and rear frame members and spaced inwardly a short distance from the left and right sides of the feeder house. A pair of upright metal plates 42 are rigidly secured to the opposite ends of the rear transverse member 36 and extend rearwardly therefrom in a direction parallel to the fore-and-aft frame members. The plates 42 are supported by a pair of angled braces 43 between the rear frame member 36 and the rearward end of the plates, and are provided with transversely aligned bores 44 adjacent their rearward ends. The bores 44 receive the pivot pins 26, so that the frame is swingable in a vertical arc about the axis of the bores 44 and pins 26. A pair of upright plates 46 are similarly rigidly attached to the opposite ends of the front transverse member 34, the front plates extending above and below the front transverse member generally perpendicular to the fore-and-aft frame members.

The feeder house typically includes a hollow housing 48 within which the frame 32 is mounted. The housing 48 includes right and left opposite side walls 50 and 52 respectively and top and bottom walls 54 and 56 respectively, the four angularly related walls 50, 52, 54, and 56 forming a forward inlet opening 58 and a rearward outlet opening 60 which registers with the inlet opening 18 in the body when the feeder house is mounted on the body. The rear edge of the bottom wall 56 is disposed forwardly of the rear edges of the other walls and the space between the rear edge of the bottom wall and the body inlet opening is covered by a vertically swingable panel 62 having its rearward end pivotally connected to the body below the inlet opening 18 and its forward edge receivable within the feeder house outlet opening 60. A toggle mechanism 64 at the rear end of the housing bottom wall is adapted to lock the front end of the panel 62 within the housing 48 to seal the connection between the body inlet opening and the feeder house outlet opening.

The rear plates 42 are provided with four transverse bores 66 around the enlarged pivot bore 44, and the rear ends of the side walls 50 and 52 are rigidly secured to the opposite plates 42 by means of bolts 68 extending through the bores 66 and corresponding bores in the side walls. The front plates 46 are also provided with four transverse bores or holes 70, and the front portion of the left side wall 52 is rigidly secured to the left-hand plate 46 by bolts 72 extending through the holes 70 and corresponding holes in the left side wall, whereby the entire left side wall is rigidly attached to the frame 32. However, the forward portion of the right side wall 50 is provided with four vertically elongated slots 74, which correspond to the four holes 70 in the right-hand front plate 46, and the front portion of the right side wall 50 is adjustably clamped to the right plate 46 by means of bolts 76 extending through the slots 74 and the bores 70, the bolts 76 being tightenable to rigidly clamp the side wall to the frame, while permitting adjustment of the front portion of the right side wall in the direction of the slots 74 when the bolts 76 are loosened. One of the bolts 76 extends through the eye of an eyebolt 78, the shank portion of which extends through a bracket 80 attached to the side walls 50. A pair of nuts 82 are threaded on the threaded shank portion of the eyebolt on opposite sides of the bracket 80, and by alternately loosening and tightening the nuts 82, the forward portion of the side wall 50 can be shifted relative to the forward end of the frame 32 when the bolts 76 are loosened, the direction of shifting movement being in the direction of elongation of the slots 74, which is perpendicular to the fore-and-aft frame members 38 and 40. Since the left side wall 52 is rigidly attached to the frame, adjustment of right side wall relative to the frame causes the forward end of the housing 48 to twist relative to the frame about a fore-and-aft axis parallel to the fore-and-aft frame members, the attachment of the left side wall to the frame serving as the pivot point for the adjustment.

Rigidly attached to the forward end of the feeder house 20 is a transversely elongated harvesting platform, indicated in its entirety by the numeral 84. The platform 84 is of conventional construction and includes a generally upright rear wall 86, which is provided with a crop transfer opening 88, which communicates with the feeder house inlet opening 58. Since the illustrated combine is a pull-type machine, the crop transfer opening 88 is not centered on the platform 84 but is disposed on the left-hand portion of the platform, the draft member 14 limiting the lateral extension of the platform to the left of the crop transfer opening. The distance that the right end of the platform is spaced from the opening 88, of course, depends on the overall width of the platform, although there is a substantial lateral extension or overhang of the platform to the right of the crop transfer opening.

In the illustrated embodiment, the platform is rigidly secured to the front end of the feeder house by a number of bolts 89, although a quickly detachable harvesting platform, such as is shown in U.S. Pat. 3,270,489 issued to Glen W. Rohweder on Sept. 6, 1966, could also be utilized within the scope of the invention.

The platform 84 conventionally includes a transversely elongated cutting mechanism 90 along the forward edge of the platform for severing the crop from the field, the severed crop being converged inwardly toward the crop transfer opening 88 by a transverse auger 92 and projected rearwardly through the feeder house inlet.

A chain and slat type feeder house conveyor 94, of conventional construction, is mounted within the feeder house and is shown only in outline, since such conveyors are well known to those versed in the art. The conveyor is driven through a transverse drive shaft 96, which coaxially extends through the left-hand pivot pin 26, the outer end of the drive shaft 96 being provided with a sprocket 98, which is driven by the drive shaft 16 through a conventional drive system, and a pulley 100, which serves as the input element for a belt-type platform drive 102.

As previously described, the feeder house and the platform carried thereby are vertically adjustable about the axis of the pivot pins 26. The vertical adjustment is accomplished by means of a pair of hydraulic cylinders 104 having their rear ends connected to the main separator body 10 by means of pivots 106 below the inlet opening 18 and their forward ends connected to the platform by means of transverse pivots 108, the cylinders 104 being disposed on opposite sides of the feeder house and extendable and retractable to respectively raise and lower the feeder house and platform.

In operation, the harvesting platform 84 is originally mounted on the front end of the feeder house 20 and the housing 48 is adjusted relative to the frame 32 so that the platform is in a level condition. As is apparent, only the forward portion of the housing 48 on which the platform is mounted, solely supports the platform, and the frame 32, which extends substantially the entire length of the housing, carries a substantial portion of the weight of the platform. As is also apparent, the frame 32 has a strong and rigid construction, and is well adapted to support the platform and withstands the twisting moment exerted by the unequal weight distribution on the platform or by the platform striking the ground or foreign objects during operation of the machine. Since the frame 32 is capable of supporting the platform, the housing 48 can be made of relatively light weight materials.

As the machine is operated, and the heavier side of the platform begins to sag, the platform can quickly be brought back into a level condition by loosening the bolts 76 and twisting the front end of the housing relative to the frame by threading the nuts 82 in the same direction along the eyebolt 78, the bolts 76 again being tightened when the platform is leveled. As is apparent, the above adjustment can also be utilized to level the platform when the platform is replaced by a different platform.

I claim:

1. In a combine having a main separator body with a forward crop inlet opening and a forwardly disposed transversely elongated harvesting platform having a rearward crop transfer opening forwardly of the body crop inlet opening, the improvement comprising: a feeder house frame mounted on and extending forwardly from the body for vertical adjustment relative thereto about its rearward end; a housing having a forward crop inlet opening and a rearward crop discharge opening; means adjustably mounting the housing on the frame with the housing crop discharge opening in registry with the separator body inlet opening; means mounting the platform on the forward end of the housing with the housing crop inlet opening in registry with the platform crop transfer opening; and a conveyor means within the housing for moving crop material from the housing inlet opening to the crop discharge opening.

2. The invention defined in claim 1 wherein the adjustable mounting means is operative to twist at least the forward portion of the housing relative to the frame about a generally fore-and-aft axis and thereby angularly adjust the platform carried by the housing about said fore-and-aft axis.

3. The invention defined in claim 2 wherein the housing has opposite upright side walls and the adjustable mounting means is operative to shift at least the forward portion of one of said side walls relative to the frame.

4. The invention defined in claim 2 wherein the rearward end of the housing is rigidly connected to the rearward end of the frame and the mounting means includes an adjusting mechanism operative between the forward end of the frame and the housing to twist the forward end of the housing relative to the rearward end about a generally fore-and-aft axis.

5. The invention defined in claim 4 wherein the housing has opposite upright side walls, one of the side walls being rigidly connected to the frame and the adjusting mechanism being operative between the forward end of the frame and the other side wall to vertically adjust the forward part of said side wall relative to the forward end of the frame.

6. The invention defined in claim 5 wherein the frame includes a pair of parallel fore-and-aft spaced transverse members and a pair of generally fore-and-aft members rigidly connecting the transverse members adjacent their opposite ends to form a generally rectangular frame, the rearward transverse member having transverse pivot means operatively associated therewith for pivotally connecting the rearward end of the frame to the body.

7. In a combine having a main separator body with a forward crop inlet opening and a forwardly disposed transversely elongated harvesting platform having a rearward crop transfer opening forwardly of the body crop inlet opening, the improvement comprising: a rigid, generally rectangular feeder house frame having front and rearward ends and including a pair of parallel, transversely spaced, generally fore-and-aft members and a pair of parallel transverse members respectively rigidly connected to the opposite ends of the fore-and-aft members; pivot means connecting the rearward end of the frame to the combine body adjacent the crop inlet opening for vertical adjustment of the frame about the axis of the pivot means; a generally fore-and-aft housing having a forward crop inlet opening and a rearward discharge opening communicating with the combine crop inlet opening and including a pair of opposite upright side walls respectively disposed on opposite sides of the frame and top and bottom walls extending between the side walls respectively above and below the frame so that the housing encloses the frame; means connecting the platform to the forward end of the housing with the platform crop transfer opening in communication with the housing inlet; and means mounting the housing to the frame.

8. The invention defined in claim 7 wherein the means mounting the housing to the frame includes fastener means operative to rigidly attach the rearward end of the housing to the rearward end of the frame and selectively adjustable connecting means operative to connect the housing to the forward end of the frame for selective adjustment of the forward end of the housing and the platform carried thereby relative to the frame about a generally fore-and-aft axis to selectively vary the tilt of the platform.

9. The invention defined in claim 8 wherein the selectively adjustable connecting means is operative between the frame and a forward portion of at least one of said housing side walls.

10. The invention defined in claim 9 wherein the selectively adjustable connecting means is operative between the forward end of the frame and one of the side walls to vertically adjust the forward end of the side wall relative to one side of the frame, the other side wall being rigidly connected to the other side of the frame so that the forward end of the housing twists about the rigid connection of said other side wall to the front end of the frame in response to adjustment of said connecting means.

References Cited

UNITED STATES PATENTS

| 2,135,621 | 11/1938 | Millard | 56—20 |
| 3,151,429 | 10/1964 | Dyrdahl | 56—23 |
| 3,324,637 | 6/1967 | Ashton et al. | 56—21 |

LOUIS G. MANCENE, Primary Examiner

J. A. OLIFF, Assistant Examiner

U.S. Cl. X.R.

56—124, 208